(12) United States Patent
Hodroj

(10) Patent No.: US 11,418,965 B2
(45) Date of Patent: Aug. 16, 2022

(54) HYBRID MESH OF LICENSED AND UNLICENSED WIRELESS FREQUENCY BANDS

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 162 days.

(21) Appl. No.: 16/866,531

(22) Filed: May 4, 2020

(65) Prior Publication Data

US 2021/0345123 A1  Nov. 4, 2021

(51) Int. Cl.

| | |
|---|---|
| *H04L 12/28* | (2006.01) |
| *H04W 16/14* | (2009.01) |
| *H04W 74/08* | (2009.01) |
| *H04W 4/46* | (2018.01) |
| *H04W 72/04* | (2009.01) |
| *H04J 1/16* | (2006.01) |

(52) U.S. Cl.
CPC .............. *H04W 16/14* (2013.01); *H04W 4/46* (2018.02); *H04W 72/0446* (2013.01); *H04W 72/0453* (2013.01); *H04W 74/0808* (2013.01)

(58) Field of Classification Search
CPC ......... H04W 4/46; H04W 4/80; H04W 16/14; H04W 76/14; H04W 88/06; H04W 72/0453
USPC .................................. 370/252, 329, 386, 430
See application file for complete search history.

(56) References Cited

U.S. PATENT DOCUMENTS

| | | |
|---|---|---|
| 4,041,393 A | 8/1977 | Reed |
| 4,388,608 A | 6/1983 | Bernard |
| 4,587,651 A | 5/1986 | Nelson et al. |
| 4,679,191 A | 7/1987 | Nelson et al. |
| 4,726,299 A | 2/1988 | Anderson |
| 4,740,792 A | 4/1988 | Sagey et al. |
| 4,814,711 A | 3/1989 | Olsen et al. |

(Continued)

FOREIGN PATENT DOCUMENTS

WO     2019006085 A1    1/2019

OTHER PUBLICATIONS

International Searching Authority, International Search Report and Written Opinion, PCT Patent Application PCT/US2021/022217, dated Jun. 29, 2021, 9 pages.

*Primary Examiner* — John Pezzlo
(74) *Attorney, Agent, or Firm* — Perkins Coie LLP

(57) ABSTRACT

This disclosure describes techniques for creating a hybrid mesh of unlicensed wireless frequency bands between two or more vehicles communicating using an unlicensed wireless frequency band, and a massive MIMO base station communicating with the two or more vehicles using a licensed wireless frequency band. The hybrid mesh can be used to upload and download data from a vehicle in motion. The hybrid mesh can be formed via V2V connections between the vehicle and nearby vehicles. In other words, if a vehicle moves into a region outside the operating boundary of a 5G-NR massive MIMO base-station node, the vehicle can interact with other vehicles to generate a data pipeline using the unlicensed wireless frequency band from the vehicle the nearby vehicle, and using the licensed wireless frequency band from the nearby vehicle to the nearest, massive MIMO base station.

20 Claims, 8 Drawing Sheets

(56) References Cited

U.S. PATENT DOCUMENTS

| | | |
|---|---|---|
| 4,855,822 A | 8/1989 | Narendra et al. |
| 5,122,959 A | 6/1992 | Nathanson et al. |
| 5,157,610 A | 10/1992 | Asano et al. |
| 5,208,756 A | 5/1993 | Song |
| 5,263,118 A | 11/1993 | Cornelison |
| 5,526,357 A | 6/1996 | Jandrell |
| 5,539,645 A | 7/1996 | Mandhyan et al. |
| 5,572,678 A | 11/1996 | Homma et al. |
| 5,668,880 A | 9/1997 | Alajajian |
| 5,731,785 A | 3/1998 | Lemelson et al. |
| 5,745,865 A | 4/1998 | Rostoker et al. |
| 5,953,319 A | 9/1999 | Dutta et al. |
| 6,072,421 A | 6/2000 | Fukae et al. |
| 6,078,850 A | 6/2000 | Kane et al. |
| 6,085,147 A | 7/2000 | Myers |
| 8,072,877 B2 | 12/2011 | Fredriksson |
| 2002/0181444 A1 | 12/2002 | Acampora |
| 2003/0098802 A1 | 5/2003 | Jones |
| 2003/0236601 A1 | 12/2003 | Mcleod et al. |
| 2004/0044452 A1 | 3/2004 | Bauer et al. |
| 2004/0210757 A1 | 10/2004 | Kogan et al. |
| 2004/0246147 A1 | 12/2004 | von Grabe |
| 2005/0097018 A1 | 5/2005 | Takida |
| 2012/0015607 A1 | 1/2012 | Koskela et al. |
| 2016/0183263 A1* | 6/2016 | Liu ................. H04W 24/10 370/329 |
| 2017/0026885 A1 | 1/2017 | Panigrahi et al. |
| 2017/0150490 A1 | 5/2017 | Chen et al. |
| 2018/0167948 A1* | 6/2018 | Egner ............... H04W 76/16 |
| 2018/0184273 A1* | 6/2018 | Li .................. H04W 72/0453 |
| 2020/0077240 A1 | 3/2020 | Bansal et al. |
| 2020/0154282 A1* | 5/2020 | Hofmann ........... H04W 16/14 |
| 2020/0280827 A1* | 9/2020 | Fechtel ............. H04W 4/40 |

* cited by examiner

HYBRID MESH OF LICENSED AND UNLICENSED WIRELESS FREQUENCY BANDS

BACKGROUND 5G is the fifth-generation wireless technology for digital cellular networks, where covered areas are divided into cells with one or more antennas. The frequency band of 5G is divided into millimeter waves, mid-band and low-band. 5G millimeter wave is the fastest, with speeds often being 1-2 Gbit/s on the downlink, and frequencies ranging from 24 GHz to 72 GHz. While millimeter waves have the capability to transfer large amounts of data, they cannot travel through obstacles such as terrain, buildings or other solid objects. Communication between a base station and a vehicle can consequently be interrupted by the obstacles blocking the millimeter waves.

DETAILED DESCRIPTION

Figure 1A:
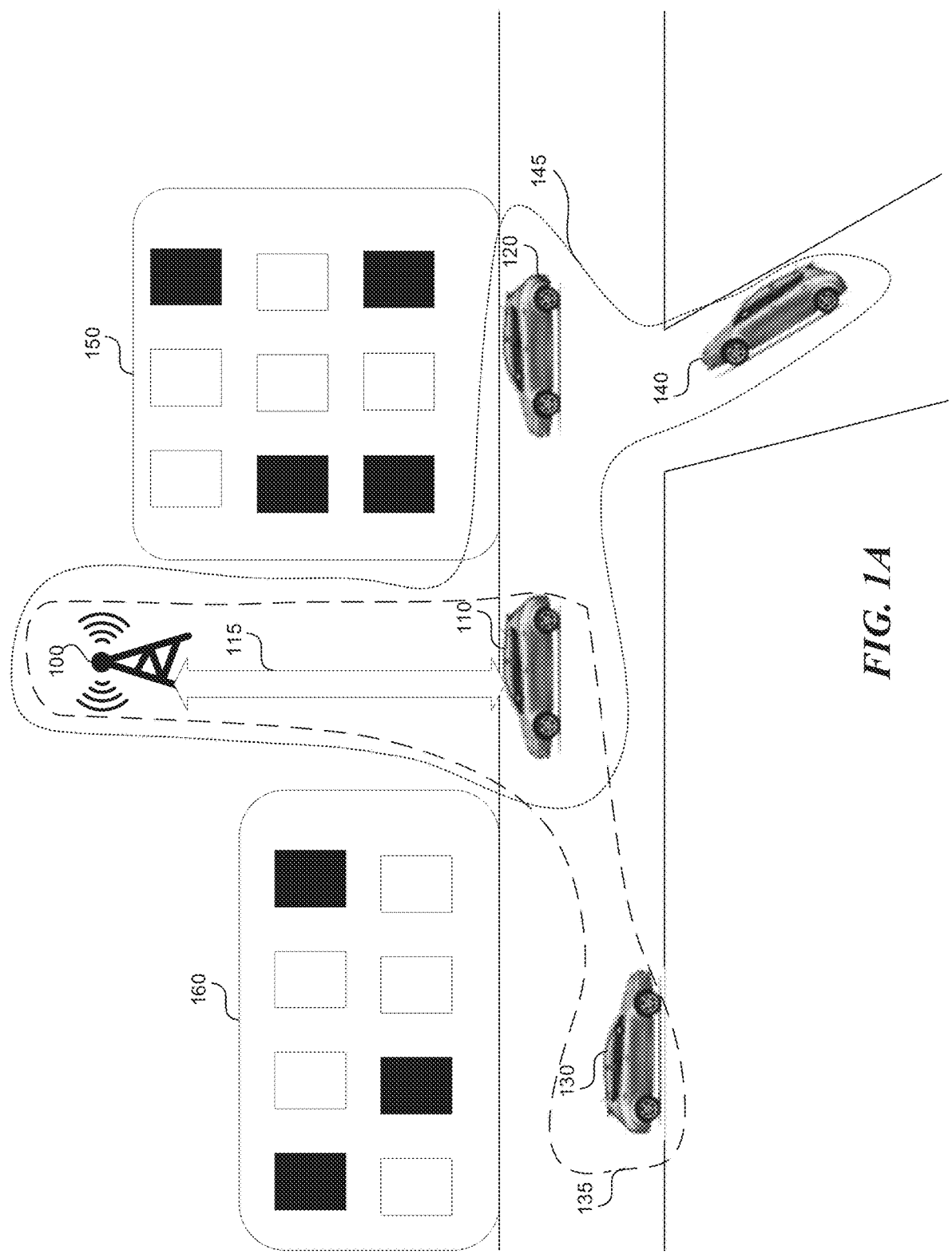
FIGS. 1A-1B show a hybrid mesh corresponding to communications between vehicles and a base station.

With the introduction of 5G-NR technology, telecommunication network subscribers will have the ability to take advantage of "millimeter waves" to broadcast data packages at frequencies between 30 and 300 GHz, rather than the 6 GHz frequency of past air-interface technologies. While millimeter waves have the capability to transfer large amounts of data, they cannot travel through changing some geographical topology (e.g., terrain, buildings or other solid objects). Thus, massive MIMO (multiple-input multiple-output) base stations with multiple antennas take advantage of beamforming technology to reliably implement the technology. Beamforming allows for a base station to broadcast a strong signal in a specific direction, rather than a relatively weaker signal in all directions.

While 5G-NR technology has the potential to dramatically improve subscriber quality of experience (QoE), the need to have the line-of-sight to obtain high-bandwidth communication between a device and a base station can impede the effectiveness of a 5G-NR transmission, particularly for subscriber devices in motion (e.g. vehicles in motion). Thus, alternative technologies are required to work in concert with a 5G-NR air-interface.

The technology described below creates a hybrid mesh of unlicensed wireless frequency bands between two or more vehicles communicating using an unlicensed wireless frequency band, and a massive MIMO base station communicating with the two or more vehicles using a licensed wireless frequency band. The licensed wireless frequency band can be under 52 GHz and above 71 GHz, while the unlicensed wireless frequency band can be in the range of 54-71 GHz. The hybrid mesh can be used to upload and download data from a vehicle in motion. The hybrid mesh can be formed via V2V connections between the vehicle and nearby vehicles. In other words, if a vehicle moves into a region outside the operating boundary of a 5G-NR massive MIMO base-station node, the vehicle can interact with other vehicles to generate a data pipeline using the unlicensed wireless frequency band from the vehicle to a nearby vehicle, and using the licensed wireless frequency band from the nearby vehicle to the nearest, massive MIMO base station.

For example, consider a vehicle traveling on a highway and initiating a request to upload or download a large data package. In this example, these techniques describe a system that would determine whether the vehicle was within range of a massive MIMO base station. If not, the system can further determine whether a hybrid mesh of unlicensed wireless frequency bands can be generated between the vehicle and a nearest massive MIMO base station, using V2V connections with other vehicles on the highway. In this example, the system would determine whether the data pipeline could be created based on other vehicles on the road and the amount of bandwidth required to transfer the large data package.

In one example, the system can determine that only a small portion of data can be transmitted at a current point-in-time using the available bandwidth. In a second example, the system can determine that a hybrid mesh can be in place at a later point-in-time. In the second example, the system can defer the transfer of the data package until the later point-in-time. In yet another example, the system can recommend a vehicle detour if a different route was determined as being more amenable to generating the hybrid mesh, such as more vehicles on the road that are capable of participating in V2V communications.

Figure 1B:
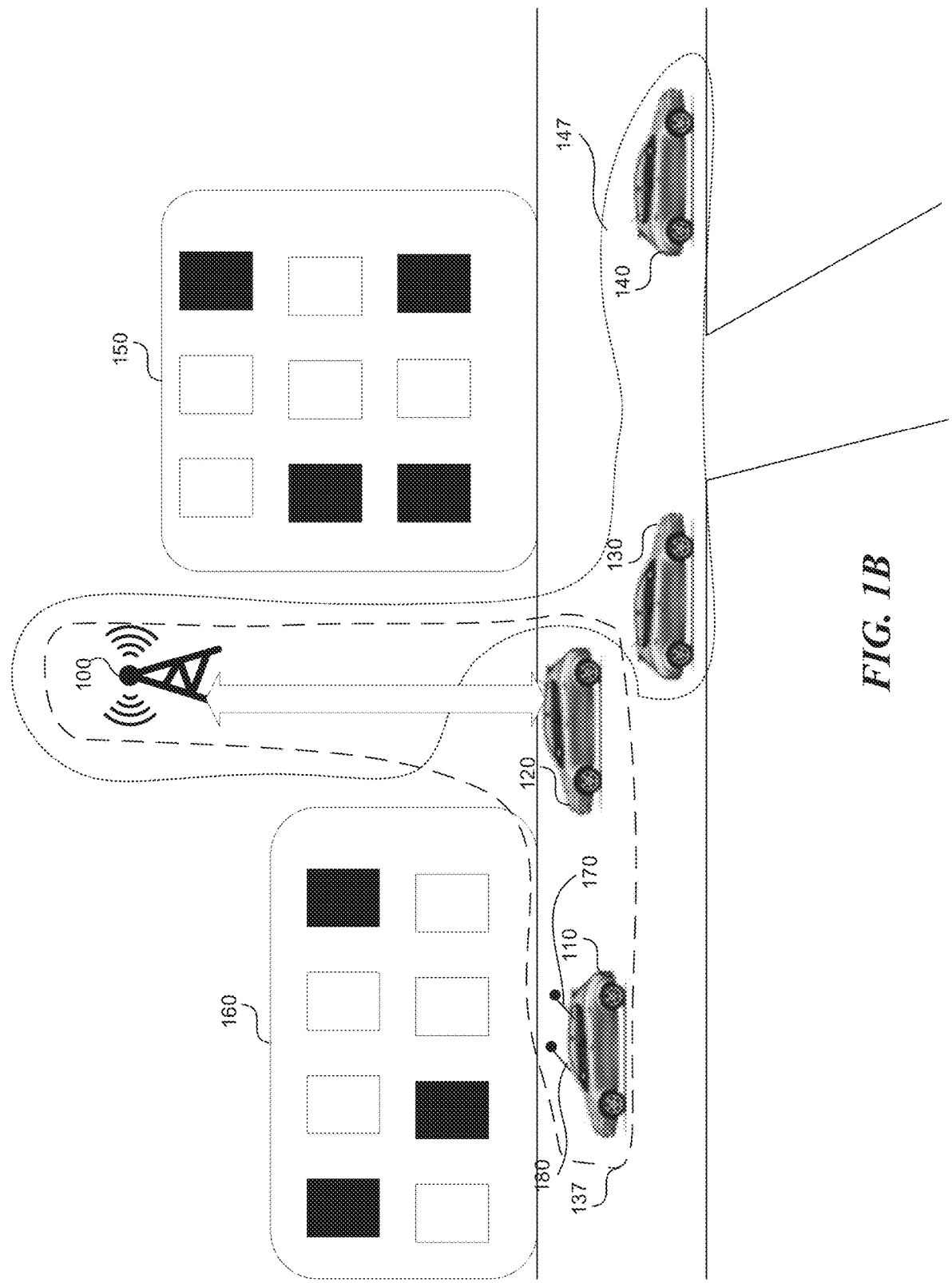

FIGS. 1A-1B show a hybrid mesh corresponding to communications between vehicles and a base station. The base station 100 can be a massive MIMO base station, offering connections in the licensed millimeter wave frequency band. The base station 100 can also be a mid-range or a low-range base station. In FIG. 1A, only vehicle 110 has a line of sight connection to the base station 100, and thus a connection 115 between the vehicle 110 and the base station 100 has the highest bandwidth. The base station 100 can be a standalone base station, or can be mounted on buildings and/or street furniture such as mailboxes, road signs, benches, traffic lights, streetlights, etc.

Obstacles, such as buildings 150, 160, can interfere with the connection between the vehicles 120, 130, 140 and the base station 100. Consequently, the vehicles 120, 130, 140 do not have a line of sight, and may not be able to connect to the base station 100 or may have a lower bandwidth connection. The vehicles 120, 130, 140 can establish a connection to the base station 100 by creating a hybrid mesh corresponding to communications between nearby vehicles. The hybrid mesh can contain two or more vehicles, depending on the distance between the vehicle and the base station 100.

For example, vehicle 120 can create a hybrid mesh including vehicles 110, 120 and the base station 100. To communicate with the base station 100, the vehicle 120 can communicate with the vehicle 110, which in turns forwards the communication to the base station 100. Similarly, vehicle 130 can create a hybrid mesh 135 including vehicles 110, 130 and the base station 100.

In another example, the vehicle 140 can create a hybrid mesh 145 including vehicles 110, 120, 140 and the base station 100. To create the hybrid mesh 145, the vehicle 140 can query nearby vehicles whether they have access to the base station 100. The unlicensed wireless frequency band can use 802.11s or 802.11ay standards to communicate. The unlicensed wireless frequency band can operate in 54-71 GHz and can have a shorter range than the licensed wireless frequency band. Consequently, the query sent by the vehicle 140 may only be able to reach vehicle 120, and not vehicle 110.

Since vehicle 120 does not have access to the base station 100, the vehicle can send the query to vehicles nearby vehicle 120. Since vehicle 110 is closer to vehicle 120 than vehicle 140, vehicle 110 can receive the query from vehicle 120 and can respond in the affirmative. Vehicle 120 can then respond to vehicle 140 that a line of sight access to the base station 100 is available. Consequently, the hybrid mesh 145 can be formed that includes all the vehicles 110, 120, 140 used in establishing the hybrid mesh 145.

Even if the original query sent by the vehicle 140 reaches both vehicles 110 and 120, a communication channel between vehicle 110 and 140 can be of lower quality than the communication channel between vehicle 120 and 140 due to the greater distance. Even if the vehicle 140 receives a reply from the vehicle 110, the vehicle 140 can decide to communicate with the vehicle 110 through vehicle 120 due to the better communication channel between the vehicle 120 and 140.

To determine which vehicles to include in the hybrid mesh, a hardware or a software processor associated with the vehicle can consider the quality of the communication channel between vehicles in the hybrid mesh based on channel properties such as packet loss, noise to signal ratio, modulation schemes associated with the channel, etc. For example, certain vehicles may be able to communicate using modulation schemes with a higher bandwidth than other vehicles. As a result, the processor can select to create a hybrid mesh out of the vehicles offering modulation schemes with higher bandwidth.

The line of sight connection with the base station 100 can change because vehicles 110, 120, 130, 140 are mobile. Consequently, the hybrid mesh 125, 135, 145 can be dynamic and change in response to changing line of sight. For example, if the vehicle 110 moves in front of the building 160, the vehicle 110 can lose the connection to the base station 100, or the connection can be severely degraded. In that time, the vehicle 120 can gain the line of sight connection to the base station 100, and the new hybrid mesh 137, 147 in FIG. 1B can be formed.

As shown in FIG. 1B, vehicles 120 and 130 can communicate directly with the base station 100, while vehicle 110 can form a hybrid mesh with vehicle 120 and the base station 100. Vehicle 140 can form a hybrid mesh 147 with vehicle 130 and the base station 100.

To enable dynamic hybrid mesh creation, the vehicles 110, 120, 130, 140 can periodically communicate with each other, to inform each other of the strength of the signal between the vehicle 110, 120, 130, 140 and the base station 100. The period can be approximately once a second or once a millisecond.

Each vehicle 110, 120, 130, 140 can have two transceivers 170, 180 (only two shown for brevity in FIG. 1B). One transceiver 170 can be a high band transceiver, e.g., a high band radio, that can be used to communicate with the base station 100. The other transceiver 180 can be a low band transceiver, e.g., a low band radio, that can be used to communicate with other vehicles 120, 130, 140 on the road, or other vehicles in the hybrid mesh 137, 147. The transceivers 170, 180 can be integrated into the vehicle 110, or can be part of a device, such as a handheld device, that can be separated from the vehicle.

The transceiver 170 can periodically communicate with the base station 100 to determine the strength of the signal to the base station and/or the channel bandwidth. The transceiver 180 can be used in querying other vehicles and responding to queries from other vehicles trying to establish a hybrid mesh. The transceiver 180 can provide responses to other vehicles based on the strength of the signal to the base station obtained by the transceiver 170.

For example, when the vehicle 110 moves behind the obstacle 150, as shown in FIG. 1B, the strength of the signal to the base station 100 and the channel bandwidth can reduce causing the vehicle 110 to inform vehicles 120, 130, 140 that vehicle 110 cannot provide communication to the base station 100. The period of communication between the vehicles 110, 120, 130, 140 in the base station can be once every second or once every millisecond. The communication between the vehicles can have the same periodicity.

Figure 2A:
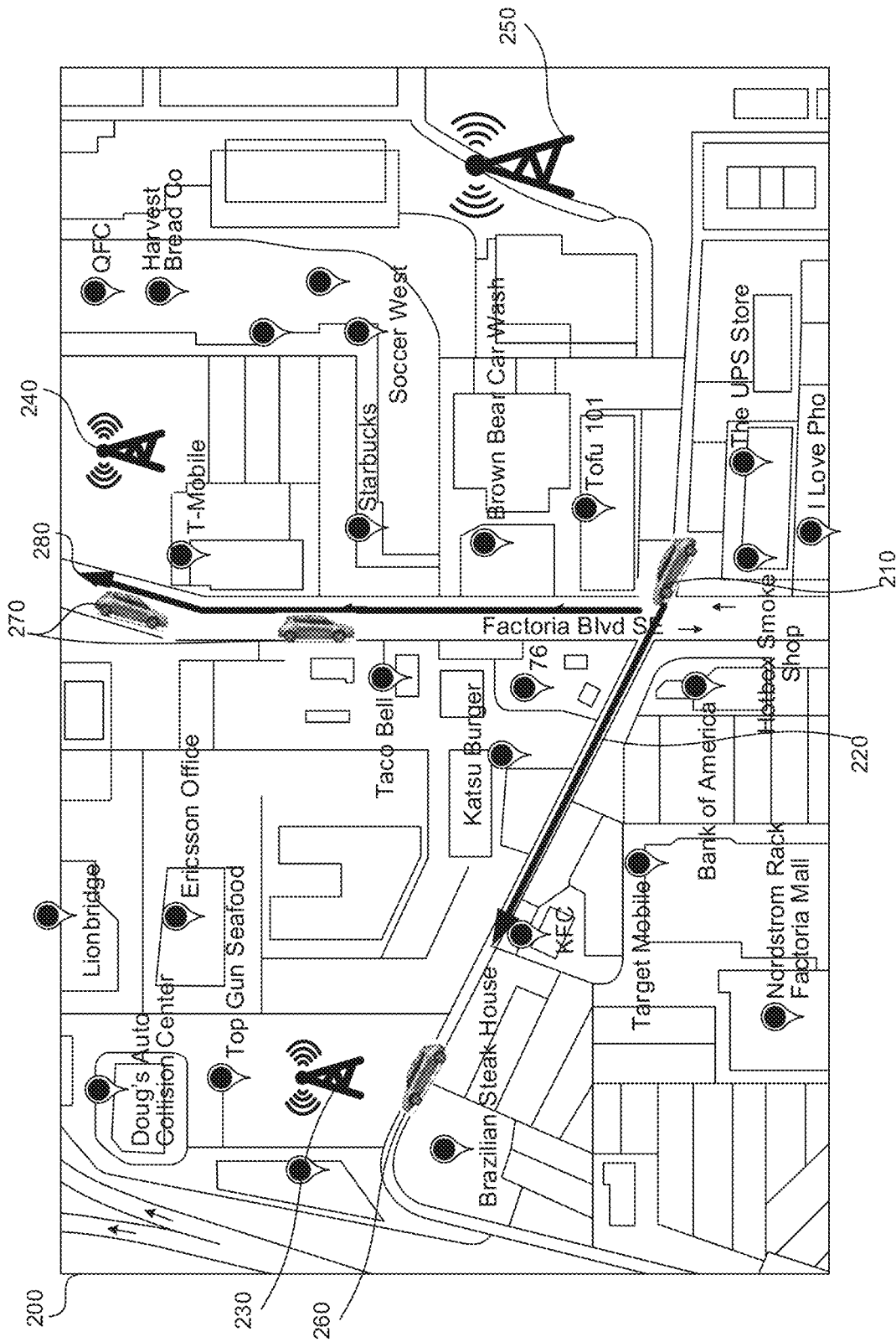
FIGS. 2A-2C show communication planning using a map of base stations and a navigation map.
Figure 2B:
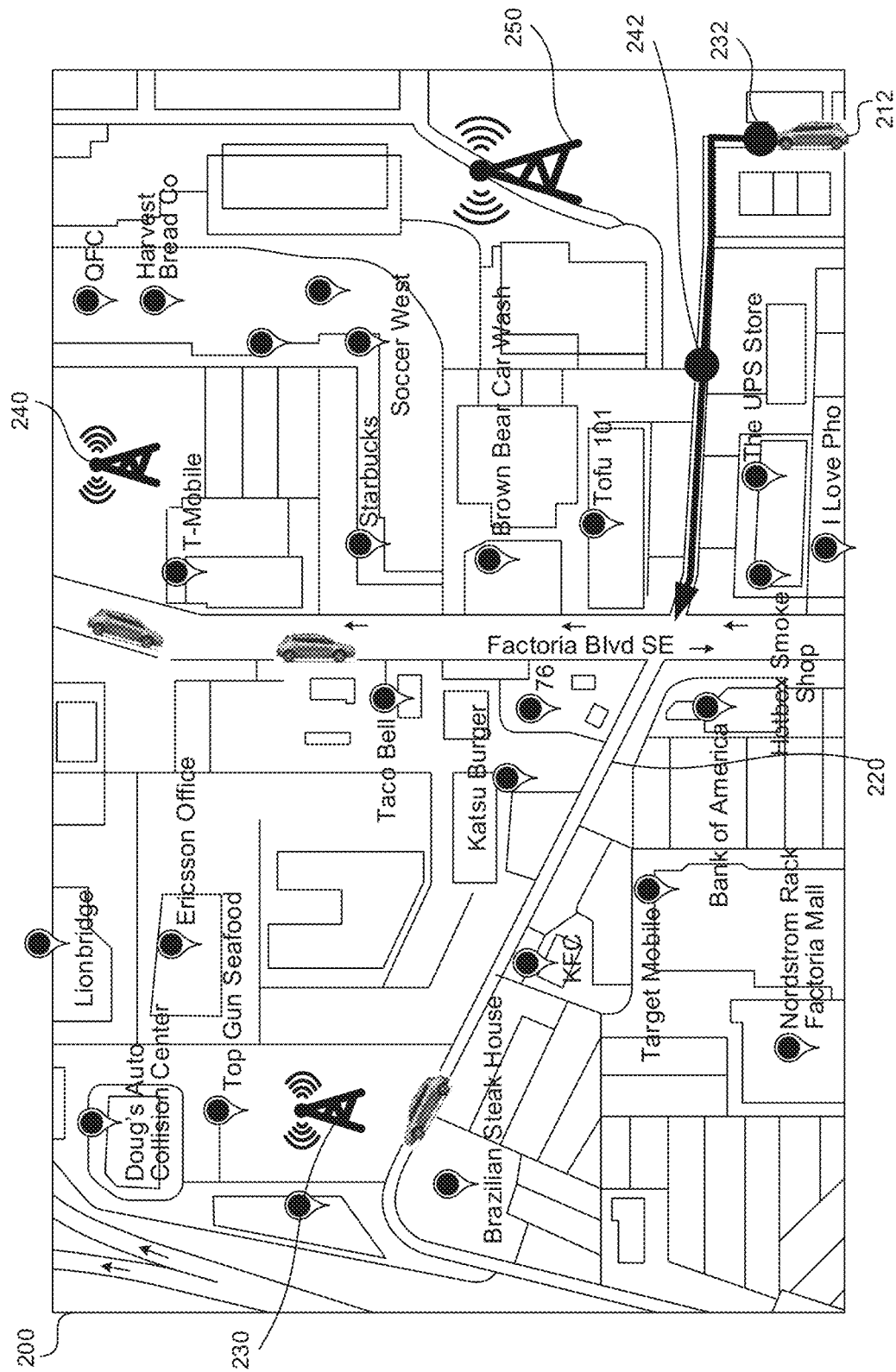
Figure 2C:
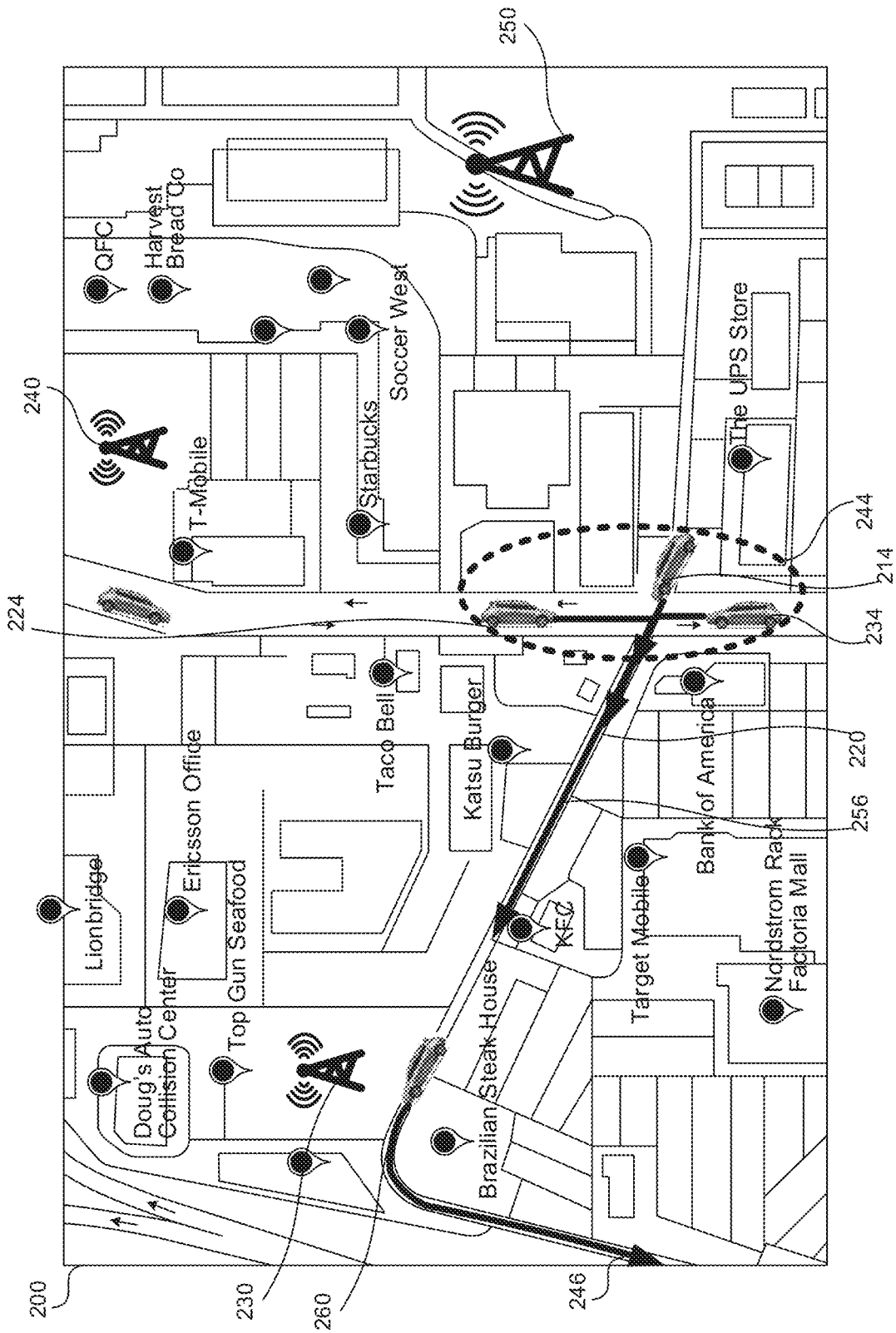

FIGS. 2A-2C show communication planning using a map of base stations and a navigation map. A processor associated with the vehicle 210 plans communication between the vehicle 210 and a base station 230, 240, 250 based on the bandwidth requirements associated with the vehicle 210, bandwidth availability and location of the base stations 230, 240, 250. The communication planning can include path planning for the vehicle 210, planning the speed of the vehicle 210, planning the appropriate base station to which to connect, and/or planning a time to make the connection.

In FIG. 2A, the processor can obtain a planned path 220 associated with the vehicle by, for example, using a navigation system associated with the vehicle 210 such as a built-in navigation system or a navigation system associated with the mobile device. The processor can also obtain a map 200 of base stations 230, 240, 250 and their geographical locations.

The processor can determine that a first group of vehicles 260 along the planned path 220 does not provide the required bandwidth for transmission and can determine an alternate path 280, having the same end point, that provides the required bandwidth for transmission. The processor can suggest the alternate path to the vehicle.

For example, the base station 230 can be a low band base station, while the bandwidth requirement can be high because the application running in the vehicle 210 can be associated with augmented reality, mixed reality, or virtual reality. Thus, the planned path 220 cannot provide the vehicle 210 with the necessary bandwidth. The base station 240 can be a millimeter wave 5G base station and can provide the necessary bandwidth. In addition, the base station 240 can be located along a busier street, where there is a second group of vehicles 270 that can create a hybrid mesh network with the vehicle 210, even when the connection between the vehicle 210 and the base station 240 is nonexistent or severely degraded. Consequently, the processor can suggest the alternate path 280 to the vehicle 210.

In FIG. 2B, the processor can obtain the map 200 of base stations along the planned path 222, the available bandwidth associated with a base station 250 along the path, and a bandwidth required to transmit the data package. The processor can determine a speed of the vehicle enabling transmission of the data package based on the available bandwidth, the bandwidth required and a location of the base station. The processor can suggest the speed to the vehicle. For example, the processor can determine that given the available bandwidth of the base station 250, and the bandwidth required to transmit the data package, a transmission of the data package between the vehicle 212 and the base station 250 can take 1 minute. The processor can calculate that between points 232 and 242, the vehicle 212 and the base station 250 can communicate with each other, and it can calculate that if the vehicle drives at 25 miles an hour, the vehicle can traverse between points 232 and 242 in 1 minute. Therefore, the processor can suggest to the vehicle to reduce the speed to a maximum of 25 miles an hour to enable transmission of the data package.

In FIG. 2C, the processor can determine that a hybrid mesh can be formed at a later point in time by gathering planned paths of the vehicle and of nearby vehicles and can delay the transmission of the data package until the hybrid mesh can be formed. For example, the vehicle 214 may not be able to establish a connection with any of the base stations 230, 240, 250. The processor can obtain the planned path 256 of the vehicle 214 and planned paths 226, 236, 246 of nearby vehicles 224, 234, 260, respectively.

Based on the planned paths 226, 236, 246, 256, the processor can determine that a hybrid mesh 244 can be formed with the vehicles 214, 224, 234 and base station 230 in approximately 30 seconds. For example, based on the planned path of the vehicle 260, the processor can determine that vehicle 260 will not be in proximity to vehicle 214 in 30 seconds, and consequently exclude the vehicle 260 from the hybrid mesh 244. In 30 seconds, the processor can form the hybrid mesh 244, and transmit the data package from the vehicle 214 upon forming the hybrid mesh 244. In forming the hybrid mesh 244, the processor can consider the speeds of vehicles 214, 224, 234, 260 to determine the positions of vehicles in the future.

Figure 3:
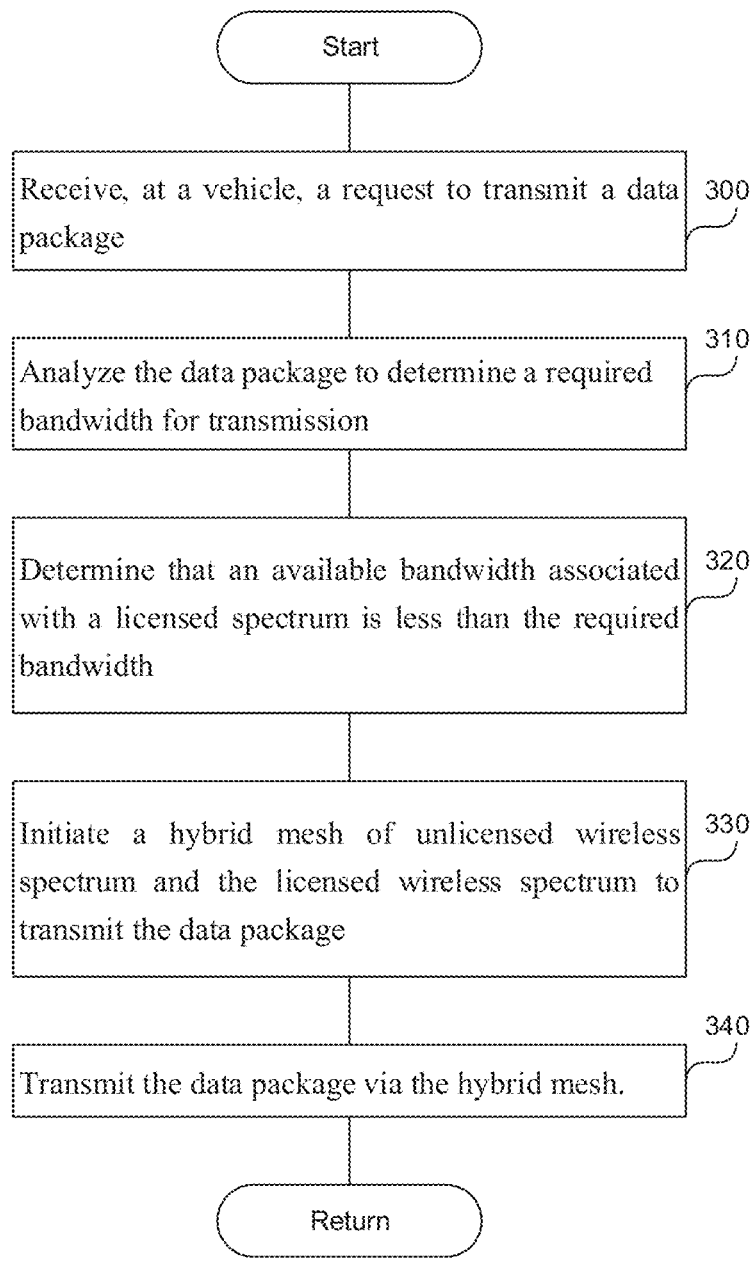
FIG. 3 is a flowchart of a method to create a hybrid mesh including multiple vehicles and a base station.

FIG. 3 is a flowchart of a method to create a hybrid mesh including multiple vehicles and a base station. In step 300, a processor can receive a request to transmit a data package. The processor can be associated with the vehicle, such as a processor and a handheld device inside a vehicle, or the processor can be integrated into the vehicle. The processor can also be associated with a base station that can communicate with a vehicle.

The vehicle can include a low band transceiver to communicate with the at least one other vehicle, and a high band transceiver to communicate with the base station. The unlicensed wireless frequency band used in V2V communication can be IEEE 802.11s or 802.11ay standard.

In step 310, the processor can analyze the data package to determine a required bandwidth for transmission. For example, if the data package requires low bandwidth for transmission, such as email, the processor does not have to communicate with a millimeter wave 5G base station, and instead can utilize a mid band or a low band base station. In another example, if the data package requires high bandwidth, such as augmented reality/mixed reality/virtual reality, the processor can connect to a high band base station, such as the millimeter wave 5G base station.

To analyze the data package received from an application, for example, the processor can query the application through the application API to obtain the required bandwidth for transmission. In another example, for 5G standalone (SA), the processor can obtain the application bandwidth requirements through a feature called network slicing, where the processor can prioritize the application flows based on specific slicing functions. For example, the slicing function can include ultra-reliable and low latency communications (URLLC), backhaul transport type, radio access network (RAN) resource allocation per service, access restriction, service availability per tracking area (TA) or public land mobile network (PLMN), device location, time of day, service key performance indicators (KPIs), frequency redirection/handover, service security, etc.

In step 320, the processor can determine that an available bandwidth associated with a licensed wireless frequency band is less than the required bandwidth. The licensed wireless frequency band can include millimeter wavelength band, such as 71-76 GHz, 81-86 GHz, and 92-95 GHz, while the unlicensed millimeter wave frequency band can be 54-71 GHz. The unlicensed millimeter wave frequency band can be a lower band than the licensed millimeter wave frequency band and can be more susceptible to absorption.

Figure 4:
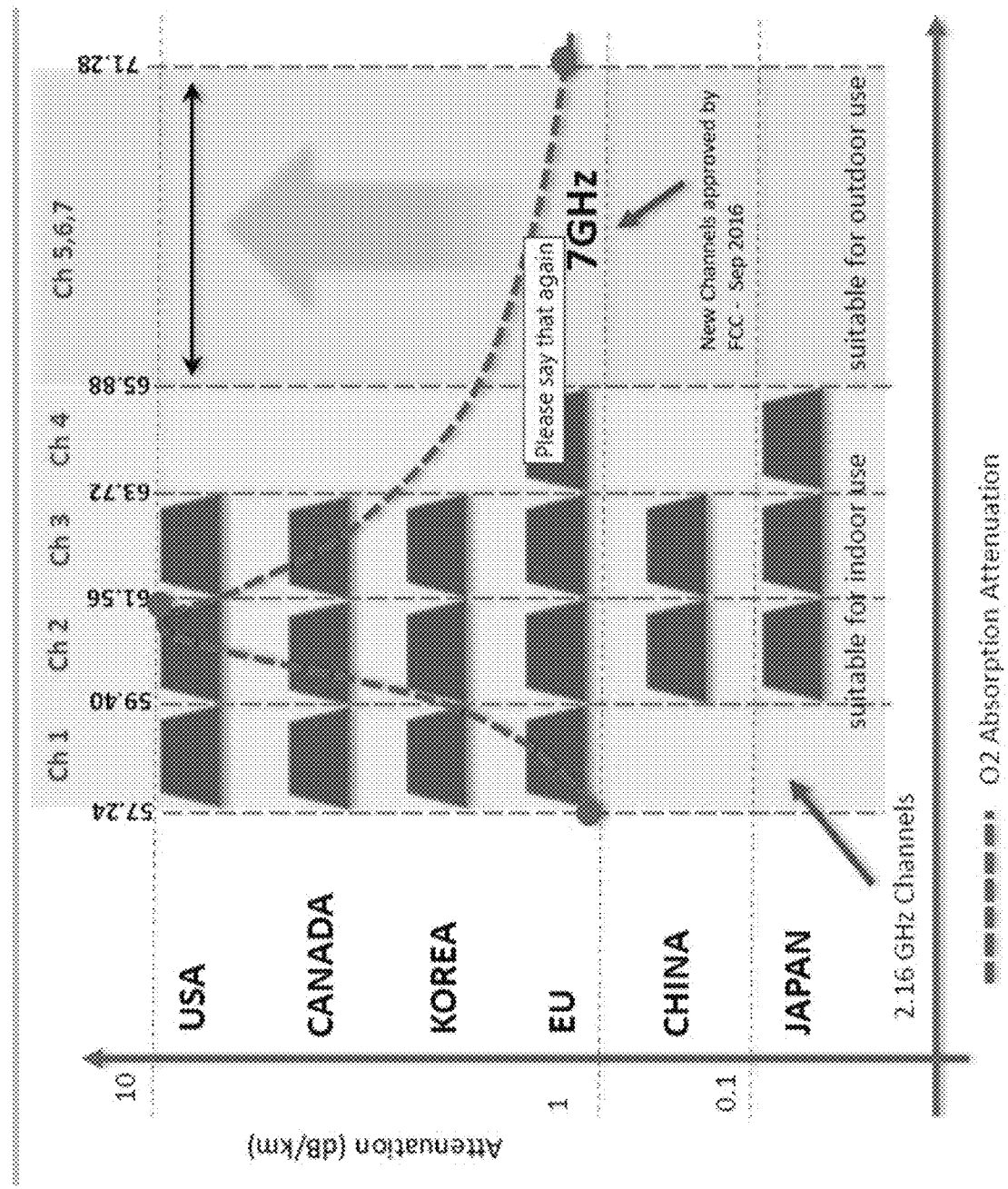
FIG. 4 shows the oxygen absorption of various frequencies in the 57.24 GHz-71.28 GHz range.

FIG. 4 shows the oxygen absorption of various frequencies in the 57.24 GHz-71.28 GHz range. As seen in FIG. 4, the oxygen absorption is the highest between 59.4 GHz and 65.88 GHz, a band that belongs to the unlicensed wireless frequency band, while the oxygen absorption drastically reduces at 71.28 GHz, which belongs to the licensed wireless frequency band. Consequently, the unlicensed wireless frequency band can cover smaller distances because of oxygen absorption, and can be used for V2V communication between neighboring vehicles, while the licensed wireless frequency band can be used for communication between a vehicle and a base station. The neighboring vehicles can be within a 1 km radius of each other.

In step 320 in FIG. 3, to determine that the available bandwidth associated with the licensed wireless frequency band is less than the required bandwidth, the processor can obtain a speed associated with the vehicle, a planned path associated with the vehicle, and a map of base stations capable of providing the required bandwidth for transmission. The processor can determine a time required to transmit the data package, such as 10 seconds. Further, the processor can determine whether the vehicle has access to a base station in the map of base stations during the time required to transmit the data package based on the speed, the planned path, and the map of base stations. Upon determining that the vehicle does not have access to the base station during the time required to transmit the data package, the processor can determine that the available bandwidth associated with the licensed wireless frequency band is less than the required bandwidth.

In step 330, the processor can initiate a hybrid mesh of unlicensed wireless frequency bands and the licensed wireless frequency band to transmit the data package, where the hybrid mesh corresponds to multiple V2V communication connections between the vehicle, at least one other vehicle and a base station associated with the licensed wireless frequency band.

To initiate the hybrid mesh, the processor can obtain multiple velocities associated with the multiple vehicles, multiple planned paths associated with the multiple vehicles and a map of base stations capable of offering the required bandwidth for transmission. The processor can determine a time required to transmit the data package based on the size of the data package, the required bandwidth for transmission, and the available bandwidth for transmission.

The processor can determine whether one or more vehicles among the multiple vehicles has access to a base station in the map of base stations during the time required to transmit the data package based on the multiple velocities, the multiple planned paths and the map of base stations. Upon determining the one or more vehicles among the multiple vehicles that has access to the base station, the processor can initiate the hybrid mesh between the vehicle and the one or more vehicles.

To determine the vehicles to include in the hybrid mesh, a processor associated with each vehicle can query nearby vehicles whether they have access to the base station, and if the nearby vehicle does not have access to the base station, the nearby vehicle can forward the request to other vehicles proximate to the nearby vehicle. The mesh can be created by including all vehicles used in identifying the vehicle with access to the base station. Alternatively, each vehicle that has access to the base station can periodically advertise to other nearby vehicles that it has access to the base station.

To determine whether a vehicle has access to the base station, a processor associated with the vehicle can measure signal strength to a base station using the high band transceiver associated with the vehicle by periodically communicating with the base station. The processor can communicate the measurement to a nearby vehicle, periodically or upon receiving a query from the nearby vehicle.

In step 340, the processor can transmit the data package via the hybrid mesh.

The processor can also suggest modifications to the vehicle to aid in the data package transmission, such as an alternate path, adjusting of the speed of the vehicle, and/or a delay in transmitting the data package.

To determine the alternate path, the processor can obtain a planned path associated with the vehicle and determine that a first group of vehicles along the planned path does not provide the required bandwidth for transmission. The processor can determine that an alternate path, having the same endpoint, provides the required bandwidth for transmission and can suggest the alternate path to the vehicle.

To determine the alternate path, the processor can obtain a map of base stations along the alternate path, the available bandwidth associated with the base station along the alternate path, a second group of vehicles along the alternate path, and a bandwidth required to transmit the data package. The processor can determine at least a portion of a second group of vehicles along the alternate path enabling transmission of the data package based on the available bandwidth, the bandwidth required and a location of the base station. The portion of the second group of vehicles can include all vehicles in the second group or a subset of the vehicles in the second group. The processor can suggest the alternate path to the vehicle. If the vehicle is an autonomous vehicle, the processor can navigate the vehicle along the alternate path.

To adjust the speed of the vehicle, the processor can obtain a map of base stations, the available bandwidth associated with a base station along the alternate path, and a bandwidth required to transmit the data package. The processor can determine a speed of the vehicle enabling transmission of the data package and can suggest the speed to the vehicle based on the available bandwidth, the bandwidth required and a location of the base station. If the vehicle is an autonomous vehicle, the processor can automatically adjust the speed.

To delay the transmission of the data package, the processor can obtain a map of base stations proximate to a vehicle, a planned path associated with the vehicle, multiple planned paths associated with multiple nearby vehicles, and/or speed of the vehicle. The processor can determine that a hybrid mesh can be formed at a later point in time based on the map of base stations, the planned path associated with the vehicle, the multiple planned paths associated with the multiple nearby vehicles, and/or speed of the vehicle. Consequently, the processor can delay transmission of the data package until the later point in time.

Computer

Figure 5:
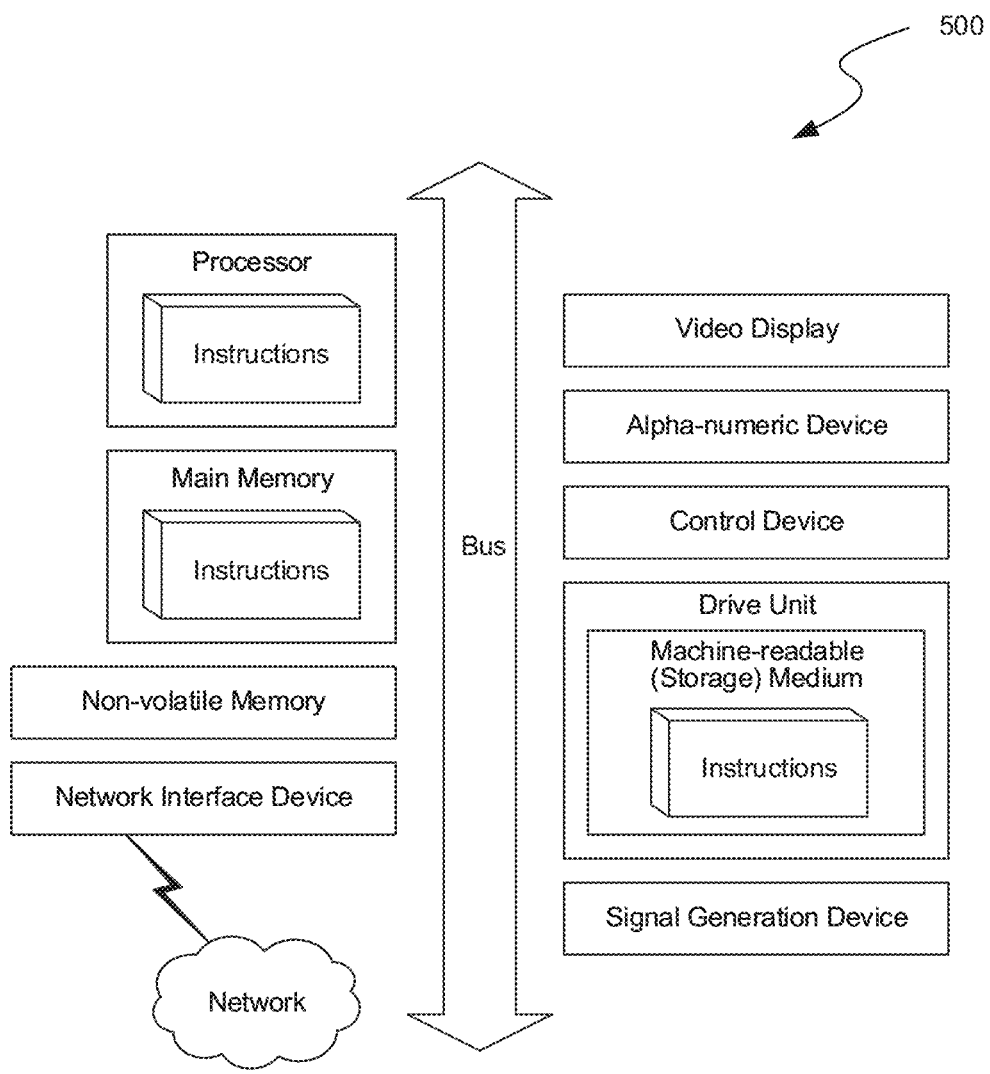
FIG. 5 is a diagrammatic representation of a machine in the example form of a computer system within which a set of instructions, for causing the machine to perform any one or more of the methodologies or modules discussed herein, may be executed.

FIG. 5 is a diagrammatic representation of a machine in the example form of a computer system 500 within which a set of instructions, for causing the machine to perform any one or more of the methodologies or modules discussed herein, may be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can be the processor executing instructions described in relation to FIG. 3 of this application. The processor of the computer system 500 can be associated with the vehicle 110, 120, 130, 140 in FIGS. 1A-1B; 210, 212, 214, 224, 234, 260 in FIGS. 2A-2C; or the processor can be associated with a base station 100 in FIG. 1; 230, 240, 250 in FIGS. 2A-2C. The main memory, the non-volatile memory and/or the drive unit of the computer system 500 can store instructions executed by the processor. The network interface device can be a low band transceiver 180 in FIG. 1B used in V2V communication or a high band transceiver 170 in FIG. 1B used to communicate with a base station. The network associated with the computer system 500 can be a licensed or an unlicensed network, as described in this application.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this application. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
one or more processors;
memory coupled to the one or more processors, wherein the memory includes instructions executable by the one or more processors to:
  receive, at a vehicle, a request to transmit a data package;
  analyze the data package to determine a required bandwidth for transmission;
  determine that an available bandwidth associated with a licensed wireless frequency band is less than the required bandwidth,
    wherein the licensed wireless frequency band comprises a millimeter wavelength band; and
  initiate a hybrid mesh of an unlicensed wireless frequency band and the licensed wireless frequency band to transmit the data package,
    wherein the hybrid mesh corresponds to multiple Vehicle-to-Vehicle (V2V) communication connections between the vehicle, at least one other vehicle and a base station associated with the licensed wireless frequency band; and
  transmit the data package via the hybrid mesh.

2. The system of claim 1, wherein determining that the available bandwidth associated with the licensed wireless frequency band is less than the required bandwidth further comprises instructions to:
  obtain a speed associated with the vehicle, a planned path associated with the vehicle, and a map of base stations capable of providing the required bandwidth for transmission;
  determine a time required to transmit the data package;
  determine whether the vehicle has access to a base station in the map of base stations during the time required to transmit the data package based on the speed, the planned path, and the map of base stations; and
  upon determining that the vehicle does not have access to the base station during the time required to transmit the data package, determine that the available bandwidth associated with the licensed wireless frequency band is less than the required bandwidth.

3. The system of claim 1, wherein initiating the hybrid mesh further comprises instructions to:
  obtain multiple speeds associated with multiple vehicles, multiple planned paths associated with the multiple vehicles, and a map of base stations capable of offering the required bandwidth for transmission;
  determine a time required to transmit the data package;
  determine whether one or more vehicles among the multiple vehicles has access to a base station in the map of base stations during the time required to transmit the data package based on the multiple speeds, the multiple planned paths and the map of base stations; and
  upon determining the one or more vehicles among the multiple vehicles has access to the base station, initiate the hybrid mesh between the vehicle and the one or more vehicles.

4. The system of claim 1, further comprising instructions to:
  obtain a planned path associated with the vehicle;
  determine that a first group of vehicles along the planned path does not provide the required bandwidth for transmission;

determine an alternate path associated with the vehicle that provides the required bandwidth for transmission; and suggest the alternate path to the vehicle, and wherein determining the alternate path further comprises instructions to:

obtain a map of base stations along the alternate path, an available bandwidth associated with a base station along the alternate path, a second group of vehicles along the alternate path, and a bandwidth required to transmit the data package;

determine at least a portion of the second group of vehicles along the alternate path enabling transmission of the data package based on the available bandwidth, the bandwidth required and a location of the base station; and suggest the alternate path to the vehicle.

5. The system of claim 1, further comprising instructions to:

obtain a planned path associated with the vehicle;

determine that a first group of vehicles along the planned path does not provide the required bandwidth for transmission;

determine an alternate path associated with the vehicle that provides the required bandwidth for transmission; and suggest the alternate path to the vehicle.

6. The system of claim 1, further comprising instructions to:

obtain a map of base stations, an available bandwidth associated with a base station in the map of base stations, and a bandwidth required to transmit the data package;

determine a speed of the vehicle enabling transmission of the data package based on the available bandwidth associated with the base station in the map of base stations, the bandwidth required, and a location of the base station; and suggest the speed to the vehicle.

7. The system of claim 1, further comprising instructions to:

obtain a map of base stations proximate to the vehicle, a planned path associated with the vehicle, and multiple planned or expected paths associated with multiple nearby vehicles;

determine that the hybrid mesh can be formed at a later point in time based on the map of base stations, the planned path associated with the vehicle and the multiple planned or expected paths associated with the multiple nearby vehicles; and delay transmission of the data package until the later point in time.

8. The system of claim 1, the vehicle comprising a low band transceiver to communicate with the at least one other vehicle, and a high band transceiver to communicate with the base station, wherein the vehicle is an autonomous vehicle, and wherein the instructions further comprise navigate the autonomous vehicle along an alternate path, or at a new speed from a current speed, to provide the required bandwidth for transmission.

9. The system of claim 1, the unlicensed wireless frequency band comprising an IEEE 802.11s or 802.11ay standard.

10. At least one non-transient, computer-readable medium, carrying instructions that, when executed by at least one data processor, performs a method comprising:

receiving, at a vehicle, a request to transmit a data package;

analyzing the data package to determine a required bandwidth for transmission;

determining that an available bandwidth associated with a licensed wireless frequency band is less than the required bandwidth, wherein the licensed wireless frequency band comprises millimeter wavelength band; and initiating a hybrid mesh of unlicensed wireless frequency band and the licensed wireless frequency band to transmit the data package, wherein the hybrid mesh corresponds to multiple Vehicle-to-Vehicle (V2V) communication connections between the vehicle, at least one other vehicle and a base station associated with the licensed wireless frequency band; and transmitting the data package via the hybrid mesh.

11. The non-transient, computer-readable medium of claim 10, wherein determining that the available bandwidth associated with the licensed wireless frequency band is less than the required bandwidth further comprises:

obtaining a speed associated with the vehicle, a planned path associated with the vehicle, and a map of base stations capable of providing the required bandwidth for transmission;

determining a time required to transmit the data package;

determining whether the vehicle has access to a base station in the map of base stations during the time required to transmit the data package based on the speed, the planned path, and the map of base stations; and upon determining that the vehicle does not have access to the base station during the time required to transmit the data package, determining that the available bandwidth associated with the licensed wireless frequency band is less than the required bandwidth.

12. The non-transient, computer-readable medium of claim 10, wherein initiating the hybrid mesh further comprises:

obtaining multiple speeds associated with multiple vehicles, multiple planned paths associated with the multiple vehicles and a map of base stations capable of offering the required bandwidth for transmission;

determining a time required to transmit the data package;

determining whether one or more vehicles among the multiple vehicles has access to a base station in the map of base stations during the time required to transmit the data package based on the multiple speeds, the multiple planned paths and the map of base stations; and upon determining the one or more vehicles among the multiple vehicles has access to the base station, initiating the hybrid mesh between the vehicle and the one or more vehicles.

13. A method comprising:

receiving a request to transmit a data package;

analyzing the data package to determine a required bandwidth for transmission;

determining that an available bandwidth associated with a licensed wireless frequency band is less than the required bandwidth; and initiating a hybrid mesh of unlicensed wireless frequency band and the licensed wireless frequency band to transmit the data package, wherein the hybrid mesh corresponds to multiple Vehicle-to-Vehicle (V2V) communication connections between a vehicle, at least one other vehicle and a base station associated with the licensed wireless frequency band; and transmitting the data package via the hybrid mesh.

14. The method of claim 13, wherein the licensed wireless frequency band comprises millimeter wavelength band.

15. The method of claim 13, wherein determining that the available bandwidth associated with the licensed wireless frequency band is less than the required bandwidth further comprises:

obtaining a speed associated with the vehicle, a planned path associated with the vehicle, and a map of base stations capable of providing the required bandwidth for transmission;

determining a time required to transmit the data package;

determining whether the vehicle has access to a base station in the map of base stations during the time required to transmit the data package based on the speed, the planned path, and the map of base stations; and upon determining that the vehicle does not have access to the base station during the time required to transmit the data package, determining that the available bandwidth associated with the licensed wireless frequency band is less than the required bandwidth.

16. The method of claim 13, wherein initiating the hybrid mesh further comprises:

obtaining multiple speeds associated with multiple vehicles, multiple planned paths associated with the multiple vehicles and a map of base stations capable of offering the required bandwidth for transmission;

determining a time required to transmit the data package;

determining whether one or more vehicles among the multiple vehicles has access to a base station in the map of base stations during the time required to transmit the data package based on the multiple speeds, the multiple planned paths and the map of base stations; and upon determining the one or more vehicles among the multiple vehicles has access to the base station, initiating the hybrid mesh between the vehicle and the one or more vehicles.

17. The method of claim 13, further comprising:

obtaining a planned path associated with the vehicle;

determining that a first group of vehicles along the planned path does not provide the required bandwidth for transmission;

determining an alternate path associated with the vehicle that provides the required bandwidth for transmission; and suggesting the alternate path to the vehicle.

18. The method of claim 17, wherein determining the alternate path further comprises:

obtaining a map of base stations along the alternate path, an available bandwidth associated with a base station along the alternate path, a second group of vehicles along the alternate path, and a bandwidth required to transmit the data package;

determining at least a portion of the second group of vehicles along the alternate path enabling transmission of the data package based on the available bandwidth associated with the base station along the alternate path, the bandwidth required and a location of the base station; and suggesting the alternate path to the vehicle.

19. The method of claim 13, further comprising:

obtaining a map of base stations proximate to the vehicle, a planned path associated with the vehicle and multiple planned paths associated with multiple nearby vehicles;

determining that the hybrid mesh can be formed at a later point in time based on the map of base stations, the planned path associated with the vehicle and the multiple planned paths associated with the multiple nearby vehicles; and delaying transmission of the data package until the later point in time.

20. The method of claim 13, further comprising:

measuring signal strength to the base station using a high band transceiver associated with the vehicle by periodically communicating with the base station; and communicating the measurement to a nearby vehicle.

* * * * *